(12) United States Patent
Horiuchi et al.

(10) Patent No.: US 11,691,323 B2
(45) Date of Patent: Jul. 4, 2023

(54) CONTROL DEVICE AND CONTROL METHOD FOR INJECTION MOLDING MACHINE

(71) Applicant: FANUC CORPORATION, Minamitsuru-gun (JP)

(72) Inventors: Atsushi Horiuchi, Yamanashi-ken (JP); Hiroyasu Asaoka, Yamanashi-ken (JP); Kenjirou Shimizu, Yamanashi-ken (JP)

(73) Assignee: FANUC CORPORATION, Yamanashi (JP)

( * ) Notice: Subject to any disclaimer, the term of this patent is extended or adjusted under 35 U.S.C. 154(b) by 349 days.

(21) Appl. No.: 17/024,366

(22) Filed: Sep. 17, 2020

(65) Prior Publication Data

US 2021/0086421 A1 Mar. 25, 2021

(30) Foreign Application Priority Data

Sep. 20, 2019 (JP) ................. 2019-171726

(51) Int. Cl.
*B29C 45/46* (2006.01)
*B29C 45/62* (2006.01)
(Continued)

(52) U.S. Cl.
CPC ............ *B29C 45/461* (2013.01); *B29C 45/50* (2013.01); *B29C 45/60* (2013.01); *B29C 45/62* (2013.01);
(Continued)

(58) Field of Classification Search
CPC ... B29C 2045/5096; B29C 2945/76113; B29C 2945/76598; B29C 45/50
See application file for complete search history.

(56) References Cited

U.S. PATENT DOCUMENTS 5,756,037 A 5/1998 Kitamura

FOREIGN PATENT DOCUMENTS

| JP | H0741652 B2 * | 5/1995 | ............. B29C 45/50 |
| JP | H09-29794 A | 2/1997 | |
| JP | 2005035132 A * | 2/2005 | ............. B29C 45/50 |

OTHER PUBLICATIONS

Translation of JP-H0741652-B2 (Year: 1995).*
Translation of JP-2005035132-A (Year: 2005).*

* cited by examiner

*Primary Examiner* — Xiao S Zhao
*Assistant Examiner* — John J DeRusso
(74) *Attorney, Agent, or Firm* — McGinn I.P. Law Group, PLLC

(57) ABSTRACT

A control device for an injection molding machine including a cylinder into which a resin is supplied and a screw that moves forward and rearward and rotates inside the cylinder, includes a metering control unit that performs metering of the resin inside the cylinder by controlling forward rotation and rearward movement of the screw until the screw has been moved rearward to a predetermined metering position, based on predetermined metering conditions, a rearward movement speed acquisition unit acquiring a rearward movement speed of the screw, a speed determination unit that determines a suck back speed for causing a resin pressure to reach a target pressure, based on the rearward movement speed acquired during metering by the rearward movement speed acquisition unit, and a suck back control unit causing the screw to move further rearward based on the suck back speed, after the screw has reached the predetermined metering position.

8 Claims, 8 Drawing Sheets

(51) Int. Cl.
  *B29C 45/80*  (2006.01)
  *B29C 45/50*  (2006.01)
  *B29C 45/77*  (2006.01)
  *B29C 45/60*  (2006.01)
(52) U.S. Cl.
  CPC .............. *B29C 45/77* (2013.01); *B29C 45/80* (2013.01); *B29C 2045/5096* (2013.01); *B29C 2945/76006* (2013.01); *B29C 2945/76113* (2013.01); *B29C 2945/76214* (2013.01); *B29C 2945/76367* (2013.01); *B29C 2945/76598* (2013.01); *B29C 2945/76665* (2013.01); *B29C 2945/76692* (2013.01)

CONTROL DEVICE AND CONTROL METHOD FOR INJECTION MOLDING MACHINE

CROSS-REFERENCE TO RELATED APPLICATION

This application is based upon and claims the benefit of priority from Japanese Patent Application No. 2019-171726 filed on Sep. 20, 2019, the contents of which are incorporated herein by reference.

BACKGROUND OF THE INVENTION

Field of the Invention

The present invention relates to a control device and a control method for an injection molding machine.

Description of the Related Art

In relation to an injection molding machine, certain methods have been proposed in order to reduce variations in the product quality of molded products. For example, in Japanese Laid-Open Patent Publication No. 09-029794, in relation to an injection device (injection unit), it has been proposed to carry out sucking back of a screw and reverse rotation of the same screw sequentially in this order after metering of a resin. According to the disclosure, by such actions, variations in the weight of the resin inside the cylinder can be reduced.

SUMMARY OF THE INVENTION

Incidentally, when sucking back of the screw is performed, it is necessary for an operator to determine the suck back speed in advance. However, in order to properly determine such a speed, the operator must take into consideration the metering conditions and also the material characteristics of the resin. Such operations tend to be troublesome for the operator to perform. Further, for an operator who is particularly unfamiliar with handling an injection molding machine, since the operator may not be able to appropriately determine the suck back speed, molding defects are disadvantageously made to occur.

Thus, the present invention has the object of providing a control device and a control method for an injection molding machine, in which the suck back speed can appropriately and easily be determined.

One aspect of the present invention is characterized by a control device for an injection molding machine including a cylinder into which a resin is supplied, and a screw configured to move forward and rearward and rotate inside the cylinder, the control device including a metering control unit configured to perform metering of the resin inside the cylinder by controlling a forward rotation and a rearward movement of the screw until the screw has been moved rearward to a predetermined metering position, based on a predetermined metering condition, a rearward movement speed acquisition unit configured to acquire a rearward movement speed of the screw, a speed determination unit configured to determine a suck back speed in order for a pressure of the resin to be made to reach a target pressure, based on the rearward movement speed of the screw acquired during metering by the rearward movement speed acquisition unit, and a suck back control unit configured to cause the screw to be further moved rearward based on the suck back speed, after the screw has reached the predetermined metering position.

Another aspect of the present invention is characterized by a method of controlling an injection molding machine including a cylinder into which a resin is supplied, and a screw configured to move forward and rearward and rotate inside the cylinder, the method including a metering step of performing metering of the resin inside the cylinder by controlling a forward rotation and a rearward movement of the screw until the screw has been moved rearward to a predetermined metering position, based on a predetermined metering condition, and acquiring a rearward movement speed of the screw, a speed determination step of determining a suck back speed in order for a pressure of the resin to be made to reach a target pressure, based on the rearward movement speed acquired in the metering step, and a suck back step of causing the screw to be further moved rearward based on the suck back speed, after having completed the metering step and the speed determination step.

According to the present invention, a control device and a control method for an injection molding machine are provided, in which the suck back speed can appropriately and easily be determined.

The above and other objects, features, and advantages of the present invention will become more apparent from the following description when taken in conjunction with the accompanying drawings, in which a preferred embodiment of the present invention is shown by way of illustrative example.

DESCRIPTION OF THE PREFERRED EMBODIMENTS

Preferred embodiments of a control device and a control method for an injection molding machine according to the present invention will be presented and described in detail below with reference to the accompanying drawings. Moreover, it should be noted that the respective directions described below conform to the arrows shown in each of the drawings.

Embodiments

Figure 1:
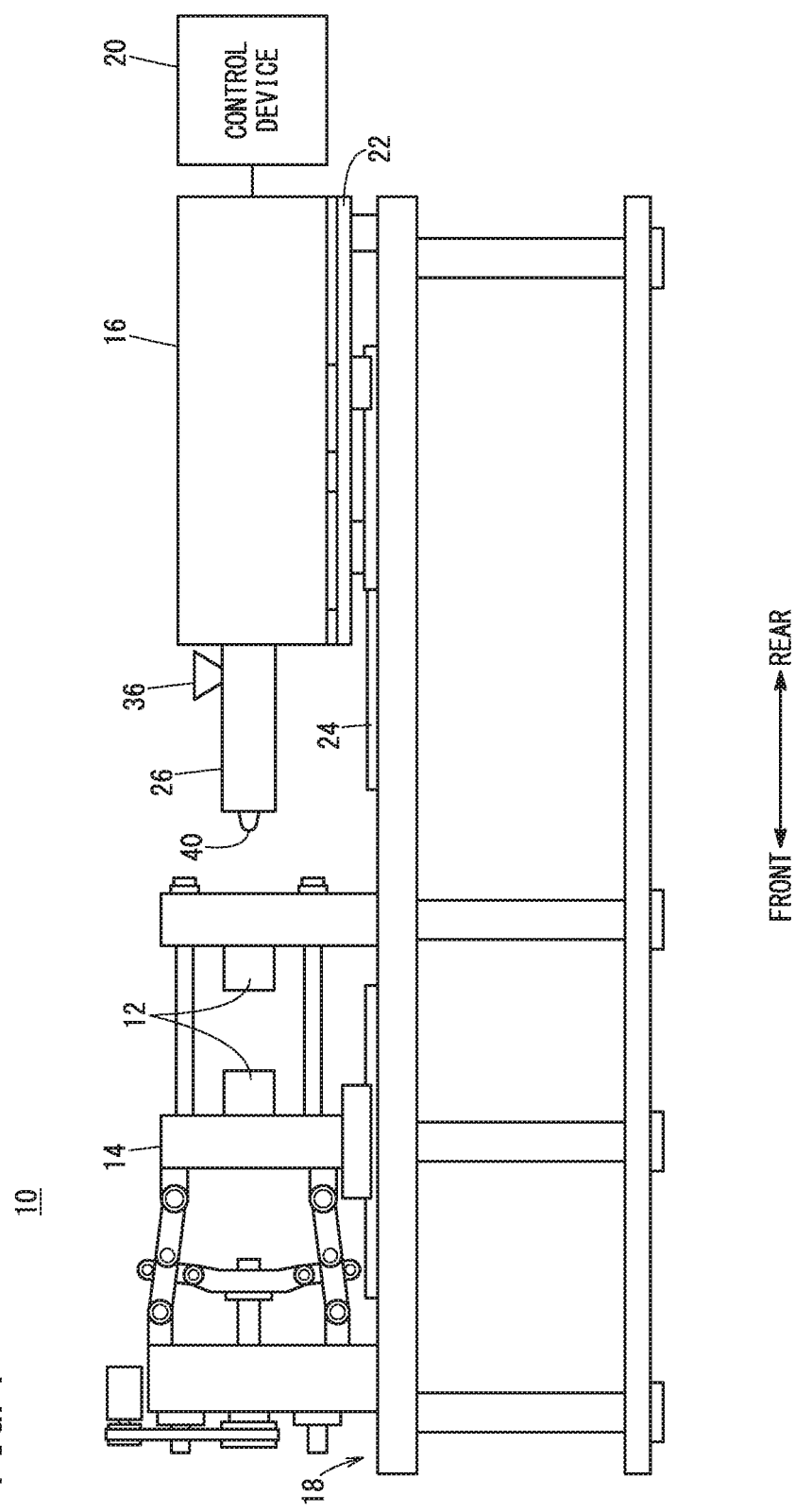
FIG. 1 is a side view showing an injection molding machine according to an embodiment of the present invention.

FIG. 1 is a side view of an injection molding machine 10 according to an embodiment of the present invention.

The injection molding machine 10 according to the present embodiment comprises a mold clamping unit 14 having a mold 12 that is capable of being opened and closed, an injection unit 16 that faces toward the mold clamping unit 14 in a front-rear direction, a machine base 18 on which such components are supported, and a control device 20 that controls the injection unit 16.

Among such components, the mold clamping unit 14 and the machine base 18 can be configured based on a known technique. Accordingly, in the following discussion, descriptions of the mold clamping unit 14 and the machine base 18 will be appropriately omitted.

Prior to describing the control device 20 of the present embodiment, at first, a description will be given concerning the injection unit 16, which is a control target of the control device 20.

The injection unit 16 is supported by a base 22, and the base 22 is supported by a guide rail 24 which is installed on the machine base 18 so that the base 22 is capable of moving forward and backward. Consequently, the injection unit 16 is capable of moving forward and backward on the machine base 18, and can both come into contact with and separate away from the mold clamping unit 14.

Figure 2:
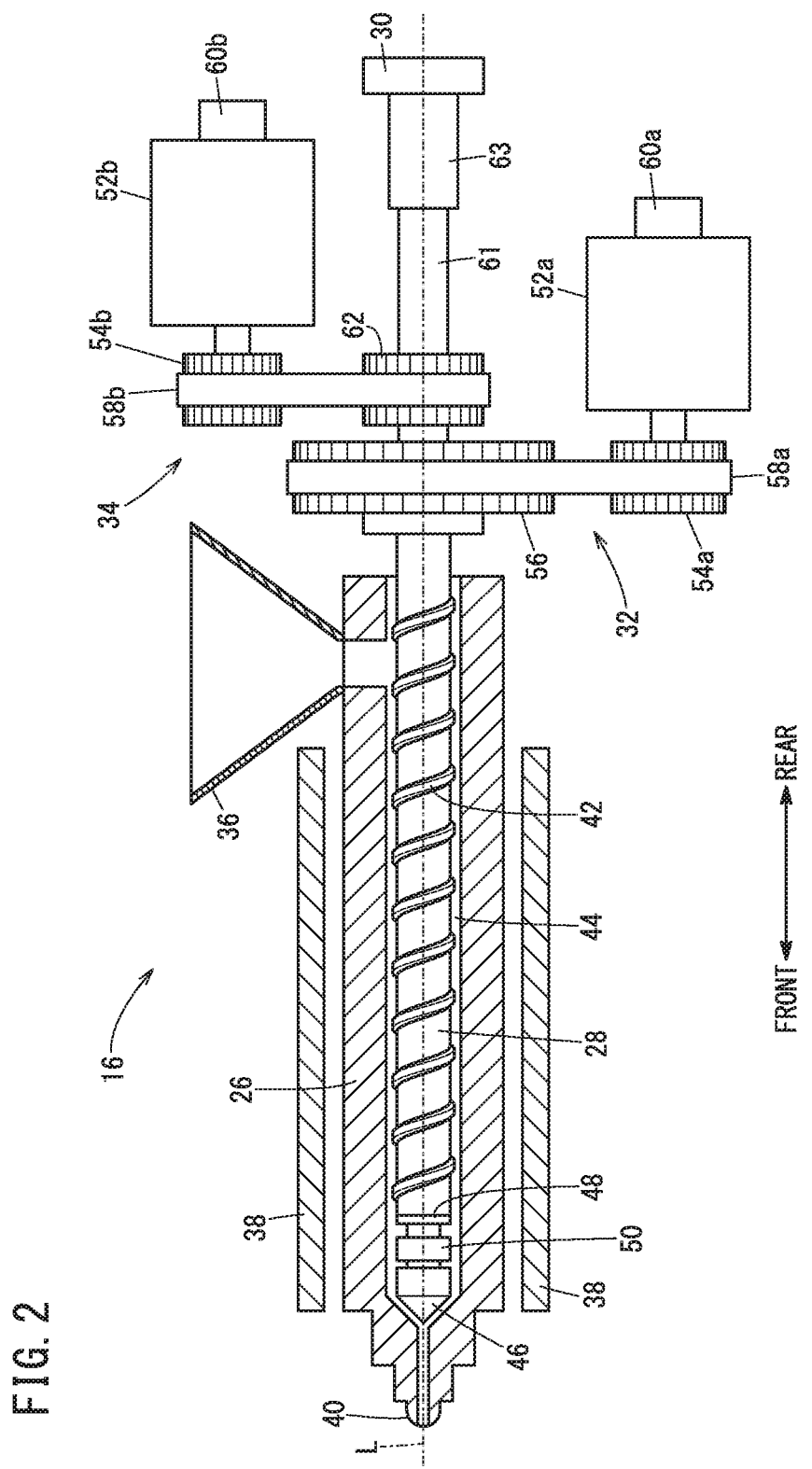
FIG. 2 is a schematic cross-sectional view of an injection unit.

FIG. 2 is a schematic cross-sectional view of the injection unit 16.

The injection unit 16 is equipped with a tubular shaped heating cylinder (cylinder) 26, a screw 28 provided inside the cylinder 26, a pressure sensor 30 provided on the screw 28, and a first drive device 32 and a second drive device 34 connected to the screw 28.

The axial lines of the cylinder 26 and the screw 28 coincide with each other on an imaginary line L according to the present embodiment. Such a system may also be referred to as an "in-line (in-line screw) system". Further, an injection molding machine to which such an in-line system is applied may also be referred to as an "in-line injection molding machine".

As advantages of such an in-line injection molding machine, there may be cited, for example, a point in which the structure of the injection unit 16 is simpler, and a point in which the maintainability thereof is excellent, as compared with other types of injection molding machines. In this instance, as another type of injection molding machine, for example, a preplasticating type injection molding machine is known.

As shown in FIG. 2, the cylinder 26 includes a hopper 36 provided on a rear side, a heater 38 for heating the cylinder 26, and a nozzle 40 provided on a front-side end thereof. Among such elements, the hopper 36 is provided with a supply port for supplying a molding material resin to the cylinder 26. Further, an injection port for injecting the resin into the cylinder 26 is provided on the nozzle 40.

The screw 28 includes a spiral flight part 42 provided to span across the longitudinal (front-rear) direction thereof. The flight part 42, together with an inner wall of the cylinder 26, constitutes a spiral flow path 44. The spiral flow path 44 guides in a frontward direction the resin that is supplied from the hopper 36 into the cylinder 26.

The screw 28 includes a screw head 46 which is on a distal end on the front side, a check seat 48 that is disposed at a certain distance in a rearward direction from the screw head 46, and a check ring (a ring for backflow-prevention) 50 that is capable of moving between the screw head 46 and the check seat 48.

The check ring 50 moves in a frontward direction relative to the screw 28 when the check ring receives a forward pressure from the resin located on a rear side of the check ring 50 itself. Further, upon receiving a rearward pressure from the resin on the front side thereof, the check ring 50 moves in a rearward direction relative to the screw 28.

At a time of metering (to be described later), the resin which is supplied from the hopper 36 to the supply port of the cylinder 26 is fed and compressed in the frontward direction while being melted along the flow path 44 by the forward rotation of the screw 28, and the pressure on a more rearward side than the check ring 50 becomes larger. When this occurs, the check ring 50 moves in the frontward direction, and the flow path 44 is gradually opened accompanying such movement. Consequently, the resin becomes capable of flowing toward the front side beyond the check seat 48 along the flow path 44.

Conversely, at a time of injection, the pressure on the front side becomes greater than the pressure on the rear side of the check ring 50. When this occurs, the check ring 50 moves in the rearward direction relative to the screw 28, and the flow path 44 is gradually closed accompanying such movement. When the check ring 50 is moved rearward until being seated on the check seat 48, a state is brought about in which it is maximally difficult for the resin to flow forward and rearward of the check ring 50, and a situation is prevented in which the resin on a more frontward side than the check seat 48 flows in reverse to a more rearward side than the check seat 48.

The pressure sensor 30, such as a load cell or the like for sequentially detecting the pressure imposed on the resin inside the cylinder 26, is attached to the screw 28. According to the present embodiment, the above-described "pressure imposed on the resin inside the cylinder 26" may also be referred to simply as a "back pressure" or alternatively a "pressure of a resin (resin pressure)".

The first drive device 32 serves to rotate the screw 28 inside the cylinder 26. The first drive device 32 includes a servomotor 52a, a drive pulley 54a, a driven pulley 56, and a belt member 58a. The drive pulley 54a rotates integrally with a rotary shaft of the servomotor 52a. The driven pulley 56 is disposed integrally on the screw 28. The belt member 58a transmits the rotational force of the servomotor 52a from the drive pulley 54a to the driven pulley 56.

When the rotary shaft of the servomotor 52a rotates, the rotational force of the servomotor 52a is transmitted to the screw 28 via the drive pulley 54a, the belt member 58a, and the driven pulley 56. Consequently, the screw 28 rotates.

In this manner, by causing the rotary shaft of the servomotor 52a to rotate, the first drive device 32 serves to rotate the screw 28. Moreover, by changing the direction in which the rotary shaft of the servomotor 52a is rotated, in response to the changing, the direction of rotation of the screw 28 can be switched between forward rotation and reverse rotation.

A position/speed sensor 60a is provided on the servomotor 52a. The position/speed sensor 60a detects the rotational position and the rotational speed of the rotary shaft of the servomotor 52a. The detection result therefrom is output to the control device 20. Consequently, the control device 20 is capable of calculating the rotation amount, the rotational acceleration, and the rotational speed of the screw 28, based on the rotational position and the rotational speed detected by the position/speed sensor 60a.

The second drive device 34 serves to move the screw 28 forward and rearward (which may be also referred to as "backward" in this specification) inside the cylinder 26. The second drive device 34 includes a servomotor 52b, a drive pulley 54b, a belt member 58b, a ball screw 61, a driven pulley 62, and a nut 63. The drive pulley 54b rotates integrally with a rotary shaft of the servomotor 52b. The belt member 58b transmits the rotational force of the servomotor 52b from the drive pulley 54b to the driven pulley 62. An axial line of the ball screw 61 and an axial line of the screw 28 coincide with each other on the imaginary line L. The nut 63 is screw-engaged with the ball screw 61.

When a rotational force is transmitted from the belt member 58b, the ball screw 61 converts the rotational force into linear motion, and transmits the linear motion to the screw 28. Consequently, the screw 28 is moved forward and rearward.

In this manner, by causing the rotary shaft of the servomotor 52b to rotate, the second drive device 34 serves to move the screw 28 forward and rearward. Moreover, by changing the direction in which the rotary shaft of the servomotor 52b is rotated, in response to the changing, the movement direction of the screw 28 can be switched between forward movement (advancing) and rearward movement (retracting).

Further, a position/speed sensor 60b which is similar to the position/speed sensor 60a is provided on the servomotor 52b. As the position/speed sensor 60b, there may be used the same type of sensor as the position/speed sensor 60a described above, however the present invention is not limited to this feature. Consequently, the control device 20 is capable of calculating the forward position and the rearward position (rearward movement distance) of the screw 28 in the front-rear direction, as well as the rearward movement speed (forward and rearward movement speed) V of the screw 28, based on the rotational position and the rotational speed detected by the position/speed sensor 60b.

In the above-described injection unit 16, when the screw 28 is forwardly rotated while introducing the resin into the cylinder 26 through the hopper 36, the resin is gradually fed and compressed in the frontward direction along the flow path 44.

During such a time, the resin is melted (plasticized) by being subjected to heating by the heater 38 and due to the rotational force of the screw 28. The molten resin accumulates in a region on the front side of the check seat 48 within the region inside the cylinder 26. Hereinafter, the region on the front side of the check seat 48 inside the cylinder 26 may also be referred to as a "metering region".

The forward rotation of the screw 28 is initiated from a state in which the screw 28 has been fully advanced inside the cylinder 26 (a state in which the volume of the metering region is at a minimum), and is performed until the screw 28 has been moved rearward to a predetermined position (metering position). Further, the rearward movement of the screw 28 is performed so as to maintain the back pressure in the vicinity of a predetermined value (metering pressure) P1. This series of steps may also be referred to as a "metering (metering step)".

By determining the position of the screw 28 at the metering position by moving the screw 28 rearward so as to maintain the back pressure during metering in the vicinity of the metering pressure P1, it is possible to keep the volume of the metering region and the density of the resin substantially constant each time that the metering is performed.

After the screw 28 has reached the metering position, the screw 28 is further moved rearward (sucked back) from the metering position. When sucking back is performed, the position of the check seat 48 is relatively moved rearward relative to the cylinder 26, and therefore, the volume of the metering region is increased. Consequently, since the pressure imposed on the resin in the metering region is alleviated, the back pressure is reduced. The step of reducing the back pressure after metering may also be referred to as "pressure reduction (pressure reducing step)".

By reducing the pressure, it is possible to reduce a risk that molding defects may be generated in which the molten resin leaks from the tip end of the nozzle 40. Such molding defects are also referred to as drooling (leakage). Such a reduction in pressure is preferably continued until the back pressure comes in close proximity to zero (target pressure P0).

Sucking back is performed on the basis of suck back conditions determined in advance prior to execution thereof. The suck back conditions serve to specify a suck back speed Vsb, and a rearward movement distance or a rearward movement time. The suck back speed Vsb is a rearward movement speed V of the screw 28 at a time of being sucked back. The rearward movement distance is the distance that the screw 28 is relatively moved rearward relative to the cylinder 26 at the time of being sucked back. The rearward movement time is a duration or continuous time period during which the screw 28 is being sucked back.

After the metering step and the subsequent pressure reducing step are completed, the resin accumulated in the metering region inside the cylinder 26 is filled into a cavity inside the mold 12. Such a step may also be referred to as "injection (injection step)". In the injection step, the screw 28 is advanced on the side of the injection unit 16, while a mold clamping force is applied to the closed mold 12 on the side of the mold clamping unit 14. At this time, the mold 12 and the nozzle 40 are pressed into contact (placed in a nozzle touching) state. As a result, the molten resin is injected from the tip end of the nozzle 40 toward the mold 12. After having carried out the injection step, the mold clamping unit 14 performs a step referred to as "mold opening (mold opening step)" to open the mold 12. Consequently, the resin that is filled in the cavity inside the mold 12 is taken out from the mold 12 as a molded product. Following the mold opening step, a step referred to as "mold closing (mold closing step)" is performed in which the mold 12 included in the mold clamping unit 14 is closed in preparation for a subsequent molding.

The plurality of steps executed by the injection molding machine 10 in order to produce the molded product may also be referred to as a "molding cycle". Each of the aforementioned metering, pressure reduction, injection, mold opening, and mold closing is a process step that can be included in the molding cycle. By repeatedly executing the molding cycle, the injection molding machine 10 is capable of mass producing molded products.

In this instance, points that should be considered in order to perform high quality molding will be described. In relation to sucking back that is performed within the molding cycle under a reduced pressure, if the suck back speed Vsb is excessive, air is drawn in from the nozzle 40 into the interior of the cylinder 26, and air bubbles become mixed in the resin inside the cylinder 26. Such bubbles become a cause of variations in the masses of the molded products, and as a result, lead to poor appearance and poor quality of such molded products. Accordingly, it is desirable for the suck back speed Vsb to be appropriately set in a manner so that air is not drawn into the cylinder 26.

When the rearward movement distance (rearward movement time) is excessively small, the back pressure will not reach zero even if sucking back is performed. In this case, even if sucking back is performed, there is a concern that drooling may occur thereafter. Such drooling causes variations in the masses of the molded products, similar to the case in which air bubbles are mixed in the resin as described above. Therefore, it is desirable that the rearward movement distance (rearward movement time) be set to a sufficient distance, in a manner so that the back pressure after being sucked back becomes less than or equal to zero.

However, among the above considerations, particularly in order to appropriately determine the suck back speed Vsb, the operator is required to take into consideration the metering conditions and also the material characteristics of the resin. Further, in certain cases, trial and error attempts in order to determine the appropriate suck back speed Vsb have been necessary. Under such circumstances, it has been difficult for the operator to appropriately determine the suck back speed Vsb.

Thus, according to the present embodiment, the control device 20 appropriately and easily determines the suck back speed Vsb without the operator being made to perform trial and error attempts. A description will be given in detail below concerning the control device 20 of the present embodiment.

Figure 3:
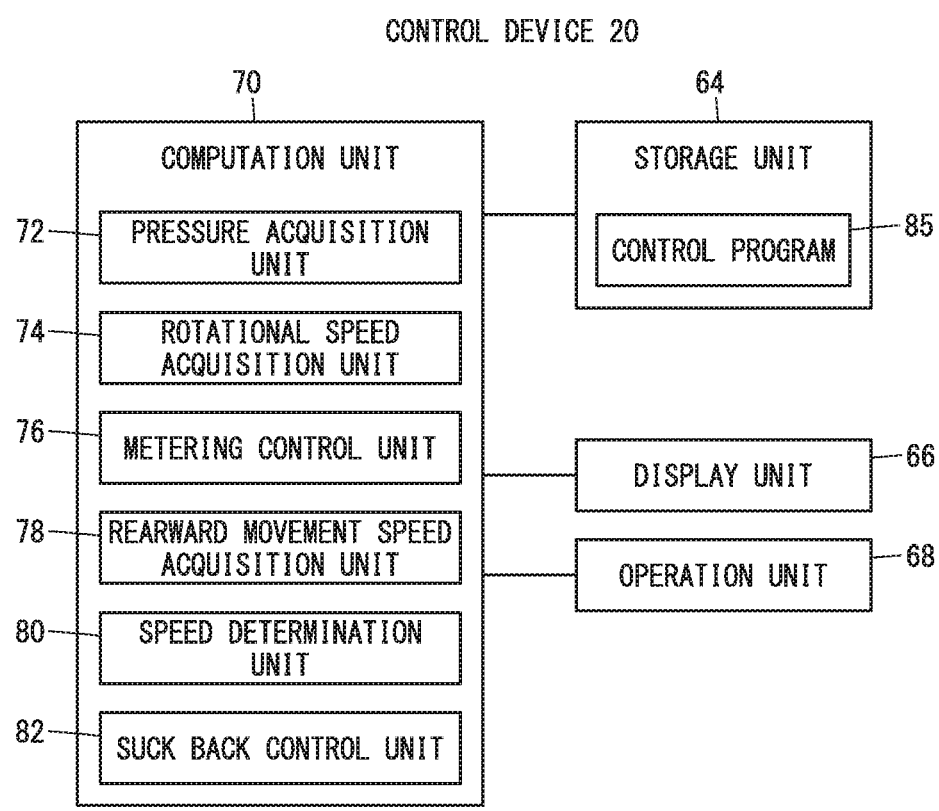
FIG. 3 is a schematic configuration diagram of a control device.

FIG. 3 is a schematic configuration diagram of the control device 20.

As illustrated in FIG. 3, the control device 20 is equipped with a storage unit 64, a display unit 66, an operation unit 68, and a computation unit 70 as a hardware configuration. The computation unit 70 may be configured by a processor such as a CPU (Central Processing Unit) or the like, however the present invention is not limited to this feature. The storage unit 64 includes a volatile memory and a nonvolatile memory, neither of which are shown. Examples of the volatile memory include a RAM or the like. Examples of the nonvolatile memory include a ROM, a flash memory, or the like.

A predetermined control program 85 for controlling the injection unit 16 is stored in advance in the storage unit 64, and apart therefrom, information is stored in the storage unit 64 as needed during execution of the control program 85.

The display unit 66, although not particularly limited, is a display device including, for example, a liquid crystal screen, and appropriately displays information in relation to the control process performed by the control device 20.

The operation unit 68, although not particularly limited, includes, for example, a keyboard, a mouse, or a touch panel that is attached to the screen of the display unit 66, and is used by an operator in order to transmit commands to the control device 20.

As illustrated in FIG. 3, the computation unit 70 includes a pressure acquisition unit 72, a rotational speed acquisition unit 74, a metering control unit 76, a rearward movement speed acquisition unit 78, a speed determination unit 80, and a suck back control unit 82. These respective units are realized by the computation unit 70 executing the aforementioned control program 85 in cooperation with the storage unit 64.

The pressure acquisition unit 72 sequentially acquires the back pressure detected by the pressure sensor 30. The acquired back pressure is stored in the storage unit 64. At this time, the acquired back pressure is stored in the storage unit 64, for example, in the form of time series data.

The rotational speed acquisition unit 74 sequentially acquires the rotational speed of the screw 28. The acquired rotational speed is stored in the storage unit 64. At this time, the acquired rotational speed is stored in the storage unit 64, for example, in the form of time series data.

The metering control unit 76 performs the above-described metering on the basis of the predetermined metering conditions. A forward rotational speed (metering rotational speed Vr) of the screw 28 during metering, and the metering pressure P1 are defined as such metering conditions. The metering control unit 76 may refer to the metering conditions that are stored in advance in the storage unit 64, or may follow along with metering conditions that are instructed (specified) by the operator via the operation unit 68.

The metering control unit 76 controls the first drive device 32, and causes the screw 28 to be forwardly rotated at the metering rotational speed Vr until the screw 28 arrives at the metering position, and in addition, controls the second drive device 34 in a manner so that the back pressure becomes the metering pressure P1, and thereby adjusts the rearward movement speed V and the position of the screw 28. During this period, the metering control unit 76 performs the control while appropriately referring to the back pressure acquired by the pressure acquisition unit 72, and the rotational speed acquired by the rotational speed acquisition unit 74.

Because of the requirement that the back pressure be maintained in close proximity to the metering pressure P1, the rearward movement speed V of the screw 28 during metering varies moment by moment. If a range of variation of the rearward movement speed V is too large, the cylinder 26 and the screw 28 may suffer from damage, or compression or stretching of the resin may be induced inside the cylinder 26, leading to a cause of deterioration in the molten state of the resin.

Thus, in principle, the metering control unit 76 adjusts the rearward movement speed V in a manner so that the rearward movement speed V falls within a predetermined speed range. The predetermined speed range can be set, for example, to 90% to 110% (±10%) of the rearward movement speed V at a point in time when the back pressure has reached the metering pressure P1 for the first time after the start of metering. However, the predetermined speed range is not limited thereto, and for example, may be ±5% of the rearward movement speed V at the point in time when the back pressure reaches the metering pressure P1.

Moreover, a case may be assumed in which the metering control unit 76 disregards the predetermined speed range, and adjusts the rearward movement speed V, for example, immediately after the start of metering. Between a period from the start of metering and until the back pressure reaches the metering pressure P1, the metering control unit 76 may disregard the predetermined speed range, and adjust the rearward movement speed V.

Within the molding cycle, the rearward movement speed acquisition unit 78 acquires at least the rearward movement speed V of the screw 28 during metering. The rearward movement speed acquisition unit 78 can acquire the rearward movement speed V which is calculated on the basis of the rotational position and the rotational speed detected by the position/speed sensor 60b. In this instance, the rearward movement speed acquisition unit 78 may also calculate the rearward movement speed V directly by itself.

Although the rearward movement speed acquisition unit 78 may acquire the rearward movement speed V at one predetermined point in time during metering, from the standpoint of reliability, it is preferable to acquire the rearward movement speed V at a plurality of points in time during the metering.

Consequently, for example, even if one from among the plurality of acquired rearward movement speeds V is significantly affected by noise, determination of the suck back speed Vsb on the basis of such an affected rearward movement speed V can be avoided. Such noise, for example, is noise that is generated in the position/speed sensor 60b. The rearward movement speed V which is significantly affected by noise may also be referred to hereinafter as a noise value.

The plurality of points in time, although not limited thereto, for example, are respective points in time taken every X seconds within a predetermined time range. A specific value of X may be set appropriately.

Further, the rearward movement speed acquisition unit 78 preferably acquires the rearward movement speed V within a predetermined time range during metering. The predetermined time range, although not limited thereto, for example, is a time range "from a point in time when the back pressure has become greater than or equal to the metering pressure P1, and until a point in time when the screw 28 reaches the metering position". Consequently, the rearward movement speed V is prevented from being acquired prior to the back pressure reaching the metering pressure P1.

The acquired rearward movement speed V is stored in the storage unit 64. In the case that the rearward movement speed acquisition unit 78 acquires rearward movement speeds V at a plurality of points in time, the plurality of rearward movement speeds V are stored in the storage unit 64. At this time, the plurality of rearward movement speeds V are stored, for example, in the form of time series data.

The speed determination unit 80 determines the suck back speed Vsb on the basis of the rearward movement speed V of the screw 28 during metering. By the speed determination unit 80 determining the suck back speed Vsb, it becomes unnecessary for the operator to perform trial and error attempts in relation to determining the suck back speed Vsb.

The speed determination unit 80 according to the present embodiment determines the suck back speed Vsb using a predetermined function f(V). The predetermined function f(V) is input with the rearward movement speed V acquired by the rearward movement speed acquisition unit 78 during metering, and outputs the suck back speed Vsb. The predetermined function f(V) is preferably a function that outputs a suck back speed Vsb which is smaller than the input rearward movement speed V that is input thereto. Consequently, it is possible to obtain a suck back speed Vsb in which the risk of air bubbles being mixed in the resin is small at a time when a later-described suck back step is executed.

The predetermined function f(V), for example, is a function that selects one from among the plurality of rearward movement speeds V, and outputs the suck back speed Vsb by setting Vsb=V×α using a predetermined compensation factor α ($0 < \alpha < 1$).

The selection of the rearward movement speed V to be input to the predetermined function f(V) can be carried out by the speed determination unit 80. The rearward movement speed V to be input may be randomly selected from among the plurality of acquired rearward movement speeds V, however, insofar as possible, it is preferable to select the rearward movement speed V having the later acquisition time. In accordance therewith, the suck back speed Vsb can be obtained based on a rearward movement speed V which is acquired when the molten state of the resin and the amount of resin in the metering region are relatively close to the molten state of the resin and the amount of resin in the metering region at the time of being sucked back. By avoiding a rearward movement speed V when melting of the resin is insufficient, and when the amount of resin in the metering region is insufficient, it is possible to obtain a suck back speed Vsb in which the risk of air bubbles being mixed in the resin is small. Further, selection of the rearward movement speed V to be input is preferably performed in a manner so that inputting of a noise value into the predetermined function f(V) is avoided. For example, from among the acquired rearward movement speeds V, it may be considered to exclude beforehand from among the options those that do not lie within a predetermined speed range. Consequently, it is possible to obtain the suck back speed Vsb in which there is a smaller risk of air bubbles becoming mixed in the resin.

The predetermined compensation factor α can be obtained experimentally in advance while taking into consideration the metering conditions and the material characteristics of the resin, or can be determined on the basis of the predetermined speed range when the rearward movement speed V is adjusted by the metering control unit 76. For example, when the range of variation of the rearward movement speed V permitted when the metering control unit 76 adjusts the rearward movement speed V is 90% to 110%, the lower limit (90%) of the range of variation can be set to the predetermined compensation factor α ($\alpha=0.9$).

The predetermined function f(V) may also be a function that outputs the suck back speed Vsb in the form of Vsb=V−β, using a predetermined compensation amount β ($0<\beta<V$). Alternatively, the predetermined function f(V) may be a function that outputs the suck back speed Vsb in the form of Vsb=V×α−β, using both the compensation factor α and the compensation amount β. The predetermined compensation amount β, in the same manner as the compensation factor α, can be obtained experimentally in advance while taking into consideration the metering conditions and the material characteristics of the resin, and in addition, the lower limit value of the range of variation of the rearward movement speed V can be determined so as to derive the suck back speed Vsb ($\beta=V\times 0.1$). Further, when the plurality of rearward movement speeds V are acquired, a difference between two of the rearward movement speeds V from among the plurality of rearward movement speeds V may be set as the predetermined compensation amount β. In that case, the predetermined compensation amount β is obtained, for example, as "a difference between the maximum value and the average value of a plurality of rearward movement speeds V" or "a difference between the average value and the minimum value of the plurality of rearward movement speeds V".

Apart from the above, the predetermined function f(V) may be a function, for example, that outputs as the suck back speed Vsb a minimum value, a maximum value, an average value, a median value, or a mode value of the plurality of rearward movement speeds V. In accordance with this feature, even if the plurality of rearward movement speeds V include a noise value, the influence that such a noise value imparts to the suck back speed Vsb can be reduced. Further, the suck back speed Vsb can be determined within a range in which the suck back speed does not exceed the rearward movement speed V during metering. In particular, a function for calculating the average value, the median value, and the mode value is preferable, in that it is possible to determine a suck back speed Vsb which does not exceed the rearward movement speed V during metering, and which is greater than the minimum value.

Further, the predetermined function f(V) may be a function that outputs as the suck back speed Vsb a value obtained by compensating a minimum value, a maximum value, an average value, a median value, or a mode value of the plurality of rearward movement speeds V, with the compensation factor α and/or the compensation amount β described above. In accordance with this feature, the suck back speed Vsb can be more reliably determined within a range in which the rearward movement speed V during metering is not exceeded.

When the suck back speed Vsb is determined, the speed determination unit 80 sets the determined suck back speed Vsb as one from among the suck back conditions.

The suck back control unit 82 performs sucking back based on the suck back conditions. In accordance therewith, the back pressure is reduced. The suck back speed Vsb, which is one of the suck back conditions, as described above, is determined by the speed determination unit 80 so that the vigorousness of such sucking back does not become excessive. Accordingly, the suck back control unit 82 is capable of causing the screw 28 to be sucked back in a manner so that air bubbles are prevented from becoming mixed in the resin inside the cylinder 26.

Figure 4:
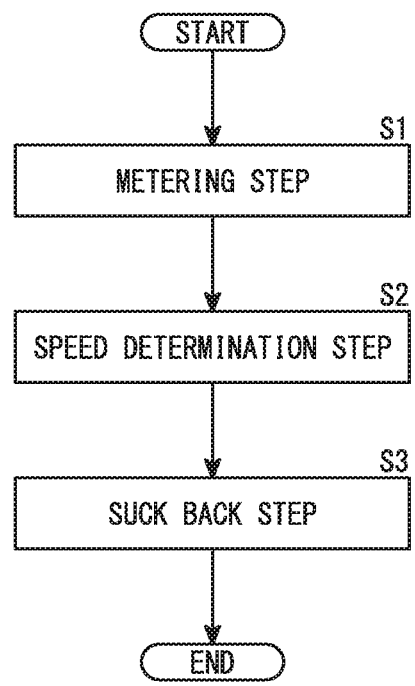
FIG. 4 is a flowchart showing an example of a control method for the injection molding machine which is executed by the control device of the embodiment.

FIG. 4 is a flowchart showing an example of a method of controlling the injection molding machine 10, which is executed by the control device 20 of the embodiment.

Figure 5:
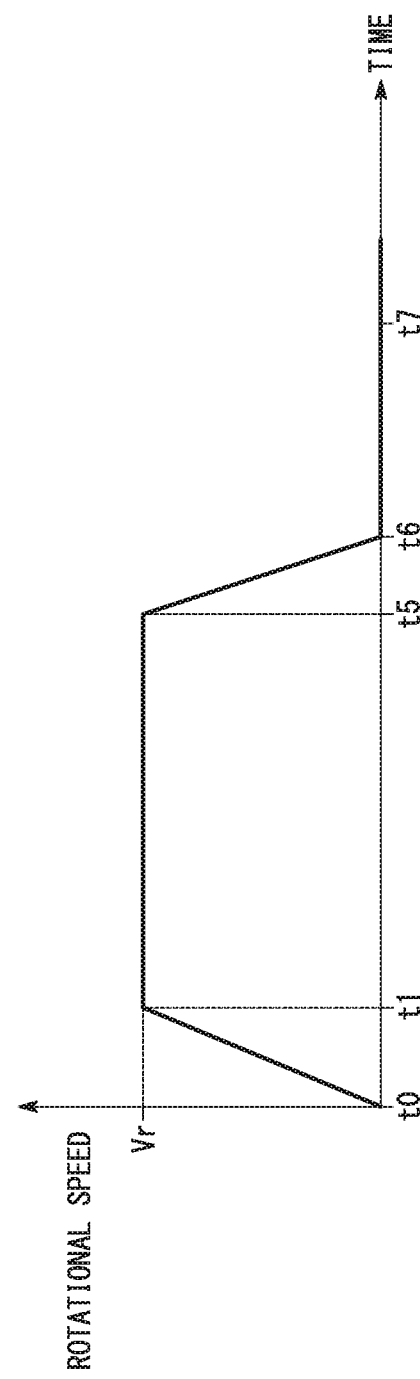
FIG. 5 is a time chart of a rotational speed of a screw in the case that the control method of the flowchart shown in FIG. 4 is performed.
Figure 6:
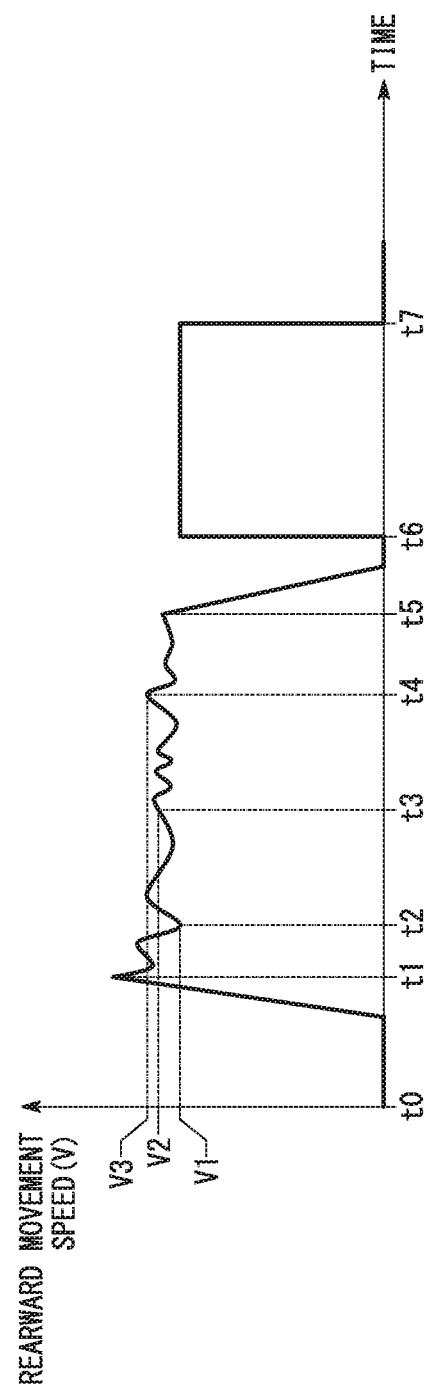
FIG. 6 is a time chart of a rearward movement speed of the screw in the case that the control method of the flowchart shown in FIG. 4 is performed.
Figure 7:
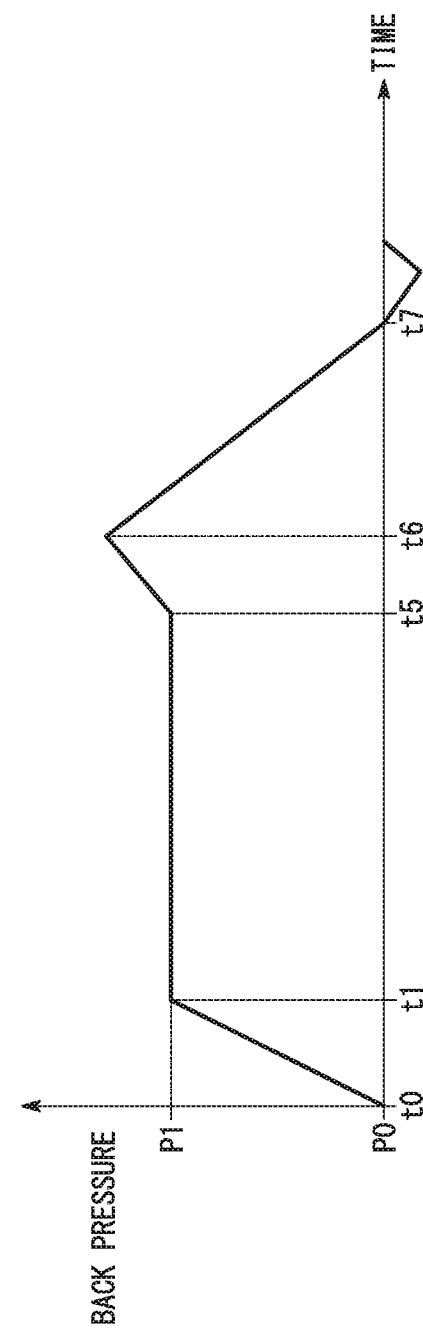
FIG. 7 is a time chart of a back pressure applied to a resin inside a cylinder in the case that the control method of the flowchart shown in FIG. 4 is performed.

FIGS. 5 to 7 are time charts concerning the rotational speed (of the screw 28), the rearward movement speed (V) (of the screw 28), and the back pressure imposed on the resin inside the cylinder 26, in the case that the control method of the flowchart of FIG. 4 is performed. Moreover, in FIGS. 5 to 7, the vertical axes thereof respectively represent the rotational speed, the rearward movement speed (V), and the back pressure. Further, the horizontal axis in each of the figures represents time.

Hereinafter, with reference to FIGS. 4 to 7, an example will be described of a case in which the metering and the reduction in pressure are carried out by the above-described control device 20.

As a premise, it is assumed that the metering conditions and the suck back conditions have been stored in the storage unit 64 in advance. Moreover, such conditions may be indicated (specified) to the control device 20 in advance by the operator via the operation unit 68.

First, the control device 20 causes a metering to be performed by the metering control unit 76 on the basis of the metering conditions, and causes the rearward movement speed V of the screw 28 during the metering to be acquired by the rearward movement speed acquisition unit 78 (step S1: metering step). The metering step continues until the screw 28 reaches the metering position.

Time t0 in FIGS. 5 to 7 indicates a point in time when the metering step is started. Time t1 indicates a point in time when the back pressure reaches the metering pressure P1. Time t2 indicates a point in time when the rearward movement speed V (V1) of the screw 28 is acquired. Time t3 indicates a point in time when the rearward movement speed V (V2) of the screw 28 is acquired. Time t4 indicates a point in time when the rearward movement speed V (V3) of the screw 28 is acquired. Further, time t5 indicates a point in time when the screw 28 has arrived at the metering position.

From time t0 to time t5 is a time zone in which metering is carried out. As shown in FIG. 5, the rotational speed of the screw 28 starts increasing from the start (time t0) of the metering step, and thereafter, reaches a predetermined metering rotational speed Vr designated by the metering conditions. Further, as shown in FIG. 7, the back pressure starts increasing after time t0 accompanying the forward rotation of the screw 28, and thereafter, reaches the metering pressure P1 designated by the metering conditions.

The timing at which the rotational speed of the screw 28 reaches the metering rotational speed Vr does not necessarily coincide with the time t1 at which the back pressure reaches the metering pressure P1. However, in FIG. 5, to facilitate description, the timing at which the rotational speed of the screw 28 reaches the metering rotational speed Vr is shown to be at time t1.

As shown in FIG. 6, the rearward movement speed V of the screw 28 is controlled so as to start increasing when the back pressure comes in close proximity to the metering pressure P1 after the metering step has started, and so that the back pressure becomes the metering pressure P1. At this time, the rearward movement speed V is adjusted within a range of variation of 90% to 110% from time t1 when the back pressure has reached the metering pressure P1.

In this instance, as an example, the control device 20 acquires a plurality of the rearward movement speeds V1 to V3 within a predetermined time range. The predetermined time range is defined as a time range from a point in time when the back pressure has become greater than or equal to the metering pressure P1, and until a point in time when the screw 28 reaches the metering position. Although where (at which points in time) the times t2 to t4 are set within the predetermined time range is not particularly limited, in this instance, it is assumed that the times are set at predetermined intervals.

Time t5 and thereafter is a time zone in which the control device 20 carries out a reduction in pressure. At time t5, on the basis of the rearward movement speed V acquired in the metering step, the speed determination unit 80 of the control device 20 determines the suck back speed Vsb in order for the resin pressure to be made to reach the target pressure P0 (step S2: speed determination step).

As described above, the speed determination unit 80 obtains the suck back speed Vsb by way of the predetermined function. Concerning the predetermined function, as described above, various functions can be adopted therefor.

In this instance, as one such example, a predetermined function is used that outputs as the suck back speed Vsb a minimum value of the three rearward movement speeds V1, V2, and V3. As shown in FIG. 6, the minimum value from among the acquired values V1, V2, and V3 is V1. Accordingly, the control device 20 determines V1 as the suck back speed Vsb.

By determining the suck back speed Vsb in a manner so as not to exceed the rearward movement speed V during metering, in a later-described suck back step, it is possible to prevent the vigorousness of such sucking back from becoming excessive.

Time t6 in FIGS. 5 to 7 indicates a point in time when the rotational speed of the screw 28 becomes zero. When the screw 28 arrives at the metering position, the metering control unit 76 stops the forward rotation and the rearward movement of the screw 28. Consequently, the rotational speed and the rearward movement speed of the screw 28 move toward zero. However, as a practical matter, it is difficult for the forward rotation and the rearward movement of the screw 28 to be stopped immediately, due to the influence of inertia in the first drive device 32 and the second drive device 34, and due to the influence of viscous resistance of the molten resin. Accordingly, stopping of the forward rotation and the rearward movement for the purpose of metering takes place a certain time after the screw 28 has reached the metering position.

The control device 20 causes the screw 28 to be further moved rearward (sucked back) by the suck back control unit 82 based on the suck back speed Vsb (step S3: suck back step). The timing at which sucking back is started is not particularly limited, as long as the timing occurs at time t5 or later, and although the timing may be specified by the operator, preferably, the timing occurs after the forward rotation and the rearward movement of the screw 28 have been stopped. In this instance, for purposes of convenience, time t6 is set as the timing at which sucking back is started.

On the basis of the suck back conditions including the suck back speed Vsb determined in the speed determination step, the suck back control unit 82 performs sucking back in a manner so that the back pressure reaches the target pressure P0. As described above, in addition to the suck back speed Vsb, the suck back conditions may include the rearward movement time or the rearward movement distance. In this instance, it is assumed that the suck back conditions include the rearward movement time.

Time t7 in FIGS. 5 to 7 indicates a point in time when sucking back is completed. For example, if the rearward movement time specified by the suck back conditions elapses from the point in time when sucking back was started, the suck back step is completed (END). Moreover, in the suck back step, preferably, by setting the rearward movement time to a sufficient length, the back pressure is made less than or equal to the target pressure P0, whereby drooling is prevented.

The above description is offered as one example of the control device 20 and the control method according to the present embodiment. However, as will be exemplified below, it should be noted that the control device 20 and the control method of the present embodiment are not limited to the features described above.

As indicated above, in the control device 20, the metering and the reduction in pressure are carried out within the molding cycle. In addition to the metering and the reduction in pressure within the molding cycle, the control device 20 may perform other process steps. For example, the control device 20 may also include constituent elements in order to control injection and mold opening.

The device or apparatus to which the control device 20 can be applied is not limited to an in-line injection molding machine (the injection molding machine 10). The control device 20 may be applied to a preplasticating type injection molding machine (a screw preplasticating type injection molding machine) which is equipped with a screw.

The configurations of the first drive device 32 and the second drive device 34 are not limited to the configurations described above. For example, instead of the servomotor 52a and the servomotor 52b, at least one of the first drive device 32 and the second drive device 34 may include a hydraulic cylinder or a hydraulic motor.

The timing at which the speed determination step is executed is not limited to time t5. For example, the speed determination step may be executed at time t3 when acquisition of the rearward movement speeds V1 to V3 has been completed.

[Modifications]

Although an embodiment has been described above as one example of the present invention, it goes without saying that various modifications or improvements are capable of being added to the above-described embodiment. It is clear from the scope of the claims that other modes to which such modifications or improvements have been added can be included within the technical scope of the present invention.

(Modification 1)

The predetermined time range is not limited to being "a time range from a point in time when the back pressure has become greater than or equal to the metering pressure P1, and until a point in time when the screw 28 reaches the metering position".

For example, the predetermined time range may be set as a time range "from a point in time when the rotational speed of the screw 28 becomes greater than or equal to the metering rotational speed Vr, and until a point in time when the screw 28 reaches the metering position". As another example, the predetermined time range may be set as a time range "from a point in time when the rearward movement speed of the screw 28 becomes greater than or equal to a metering rearward movement speed, and until a point in time when the screw 28 reaches the metering position". The metering rearward movement speed may be a predetermined value or a value specified by the operator via the operation unit 68.

(Modification 2)

Figure 8:
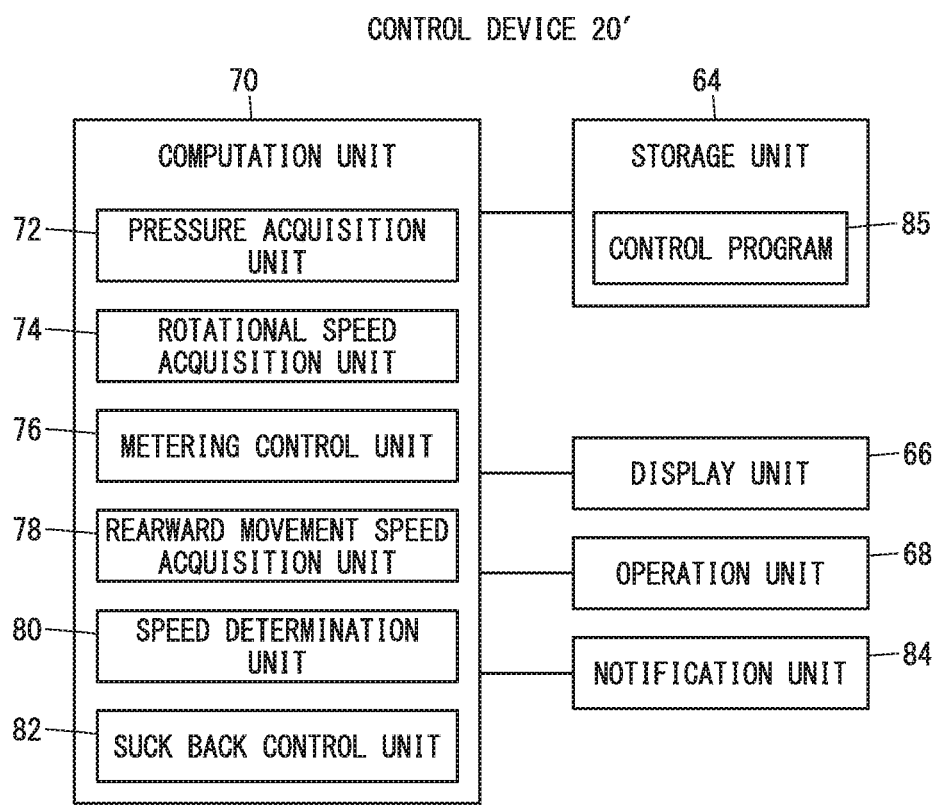
FIG. 8 is a schematic configuration diagram of a control device according to a second modification.

FIG. 8 is a schematic configuration diagram of the control device 20' according to a second modification.

The control device 20 may be further equipped with a notification unit 84 that provides a notification of the suck back speed Vsb that is determined by the speed determination unit 80.

The control device 20 may be further equipped with the notification unit 84 which issues a notification of an abnormality that has occurred at a time when sucking back is executed. According to the present modification, the control device 20 that is further equipped with the notification unit 84 is also referred to as a "control device 20'" in order to be distinguished from the control device 20 according to the embodiment.

The notification unit 84, although not particularly limited to such features, is, for example, a speaker that emits sound, or a lamp (notification lamp) that emits light. The display unit 66 that was described in the embodiment may also serve as the notification unit 84. Alternatively, the notification unit 84 may be a combination of the above-described speaker, the lamp, and the display unit 66. The notification format in the case that the display unit 66 serves as the notification unit 84 may be, for example, a format in which predetermined icons or messages are displayed on a screen.

An abnormality that occurs when sucking back is executed implies, for example, that the screw 28 is not moved rearward based on the suck back speed Vsb, even though the suck back control unit 82 has caused the screw 28 to be moved rearward. The diagnosis of whether or not such an abnormality has occurred can be realized by causing the rearward movement speed acquisition unit 78 to acquire the rearward movement speed V of the screw 28 during sucking back of the screw 28.

By being equipped with the notification unit 84, the control device 20' is capable of issuing a notification to the operator that an abnormality has occurred at the time that sucking back is executed, and can prompt the operator to take a necessary countermeasure.

After the suck back speed Vsb, which is determined by the speed determination unit 80, has been determined, the notification unit 84 may notify the operator of the suck back speed Vsb. Further, the notification unit 84 may issue both a notification of the abnormality and a notification of the determined suck back speed Vsb.

(Modification 3)

After the screw 28 has reached the metering position, the control device 20 may cause the screw 28 to be rotated in reverse. When the screw 28 is rotated in reverse, the resin passes through the check ring 50, and moves in the rearward direction (flows in reverse) from the frontward direction. As a result, by flowing in reverse to a more rearward side than the check seat 48, the pressure imposed on the resin in the metering region is alleviated, and the back pressure is reduced. In accordance with this feature, the back pressure can be reduced by causing the screw 28 to be rotated in reverse.

The reverse rotation and sucking back of the screw 28 can be performed sequentially. In this instance, the operator may transmit a command concerning such a sequential order, to the control device 20 through the operation unit 68. Further, the reverse rotation and sucking back of the screw 28 may be performed in an overlapping manner. In this instance, the operator may transmit a command concerning a timing for such an overlapping manner, to the control device 20 through the operation unit 68.

In the present modification, in the case that the reverse rotation of the screw 28 is carried out prior to sucking back the screw 28, the amount of resin in the metering region at the point in time when sucking back is started becomes smaller than the amount of resin in the metering region at the point in time when the screw 28 reaches the metering position. Accordingly, it is preferable for the speed determination unit 80 to determine a suck back speed Vsb which is capable of preventing air bubbles from becoming mixed in the resin, while taking into consideration an amount of resin in the metering region that decreases due to the reverse rotation of the screw 28.

(Modification 4)

The above-described embodiments and the modifications thereof may be appropriately combined within a range in which no technical inconsistencies occur.

Inventions that can be Obtained from the Embodiment

The inventions that can be grasped from the above-described embodiment and the modifications thereof will be described below.

First Invention

The control device (20, 20') for the injection molding machine (10) including the cylinder (26) into which the resin is supplied, and the screw (28) that moves forward and rearward and rotates inside the cylinder (26), includes the metering control unit (76) which performs metering of the resin inside the cylinder (26) by controlling the forward rotation and the rearward movement of the screw (28) until the screw (28) has been moved rearward to the predetermined metering position, on the basis of the predetermined metering conditions, the rearward movement speed acquisition unit (78) that acquires the rearward movement speed of the screw (28), the speed determination unit (80) that determines the suck back speed in order for the resin pressure (the pressure of the resin) to be made to reach the target pressure, on the basis of the rearward movement speed of the screw (28) acquired during metering by the rearward movement speed acquisition unit (78), and the suck back control unit (82) that causes the screw (28) to be further moved rearward on the basis of the suck back speed, after the screw (28) has reached the predetermined metering position.

In accordance with such features, the control device (20, 20') for the injection molding machine (10) is provided, which is capable of quickly achieving a reduction in pressure, and in which high quality molded products can be obtained.

The rearward movement speed acquisition unit (78) may acquire the rearward movement speeds at a plurality of points in time during metering, and the speed determination unit (80) may determine the suck back speed on the basis of the plurality of rearward movement speeds acquired by the rearward movement speed acquisition unit (78). In accordance with this feature, for example, even if one from among the plurality of acquired rearward movement speeds (V) is an abnormal value, determination of the suck back speed (Vsb) on the basis of such an abnormal rearward movement speed (V) can be avoided.

In the first invention, there may further be provided the pressure acquisition unit (72) that acquires the resin pressure during metering, wherein the metering control unit (76) causes the screw (28) to be moved rearward to the predetermined metering position in a manner so that the resin pressure coincides with a predetermined metering pressure, and the speed determination unit (80) may determine the suck back speed on the basis of the plurality of rearward movement speeds acquired within a range from a point in time when the resin pressure acquired by the pressure acquisition unit (72) has become greater than or equal to the predetermined metering pressure and until a point in time when the screw (28) reaches the predetermined metering position. In accordance with this feature, it is possible to reduce a risk of acquiring the rearward movement speed (V) at a time when the pressure during metering of the resin is insufficient.

In the first invention, there may further be provided the rotational speed acquisition unit (74) that acquires the rotational speed of the screw (28), wherein the metering control unit (76) causes the screw (28) to be moved rearward to the predetermined metering position while the screw (28) is forwardly rotated at the predetermined metering rotational speed, and the speed determination unit (80) may determine the suck back speed on the basis of the plurality of rearward movement speeds acquired within a range from a point in time when the rotational speed of the screw (28) acquired by the rotational speed acquisition unit (74) has become greater than or equal to the predetermined metering rotational speed, and until a point in time when the screw (28) reaches the predetermined metering position. In accordance with this feature, it is possible to reduce a risk of acquiring the rearward movement speed (V) at a time when the rotational speed of the screw (28) at the time of metering of the resin is insufficient.

The metering control unit (76) may control the screw (28) in a manner so that the rearward movement speed reaches a predetermined metering rearward movement speed during metering, and the speed determination unit (80) may determine the suck back speed on the basis of the plurality of rearward movement speeds acquired within a range from a point in time when the rearward movement speed of the screw (28) acquired during metering by the rearward movement speed acquisition unit (78) has become greater than or equal to the predetermined metering rearward movement speed and until a point in time when the screw (28) reaches the predetermined metering position. In accordance with this feature, it is possible to reduce a risk of acquiring the rearward movement speed (V) at a time when the rearward movement speed (V) at the time of metering of the resin is insufficient.

The speed determination unit (80) may determine the suck back speed based on a minimum value, a maximum value, an average value, a median value, or a mode value of the plurality of rearward movement speeds acquired by the rearward movement speed acquisition unit (78). In accordance with this feature, the suck back speed (Vsb) can be determined within a range in which the rearward movement speed (V) during metering is not exceeded. In particular, the function for calculating the average value, the median value, and the mode value is preferable, in that a suck back speed (Vsb) which does not exceed the rearward movement speed V during metering and which is greater than the minimum value can be determined.

The speed determination unit (80) may obtain one of the minimum value, the maximum value, the average value, the median value, and the mode value, and may apply a predetermined compensation amount or a predetermined compensation factor to the obtained value, thereby determining the suck back speed which is smaller than the obtained value. In accordance with this feature, it is possible to reduce a risk of defective moldings due to setting an excessive suck back speed (Vsb).

In the first invention, there may further be provided the notification unit (84) that issues at least one of a notification of the suck back speed determined by the speed determination unit (80), and a notification to such an effect in the case that the screw (28) has not been moved rearward on the basis of the suck back speed even though the suck back control unit (82) has caused the screw (28) to be moved rearward. In accordance with this feature, even if an abnormality occurs at a time that sucking back is executed, the operator can quickly be notified of such a situation.

Second Invention

In the method of controlling the injection molding machine (10) including the cylinder (26) into which the resin is supplied, and the screw (28) that moves forward and rearward and rotates inside the cylinder (26), the method including the metering step of performing metering of the resin inside the cylinder (26) by controlling the forward rotation and the rearward movement of the screw (28) until the screw (28) has been moved rearward to the predetermined metering position, on the basis of the predetermined metering conditions, and acquiring the rearward movement speed of the screw (28), the speed determination step of determining the suck back speed in order for the resin pressure (pressure of the resin) to be made to reach the target pressure, on the basis of the rearward movement speed acquired in the metering step, and the suck back step of causing the screw (28) to be further moved rearward on the basis of the suck back speed, after having completed the metering step and the speed determination step.

In accordance with such features, the control method for the injection molding machine (10) is provided, which is capable of quickly achieving a reduction in pressure, and in which high quality molded products can be obtained.

In the metering step, the rearward movement speeds may be acquired at a plurality of points in time, and in the speed determination step, the suck back speed may be determined on the basis of the plurality of rearward movement speeds acquired in the metering step. In accordance with this feature, for example, even if one from among the plurality of acquired rearward movement speeds (V) is an abnormal value, determination of the suck back speed (Vsb) on the basis of such an abnormal rearward movement speed (V) can be avoided.

In the metering step, the resin pressure may be acquired, and the screw (28) may be moved rearward to the predetermined metering position in a manner so that the resin pressure coincides with a predetermined metering pressure, and in the speed determination step, the suck back speed may be determined on the basis of the plurality of rearward movement speeds acquired within a range from a point in time when the resin pressure, in the metering step, has become greater than or equal to the predetermined metering pressure and until a point in time when the screw (28) reaches the predetermined metering position. In accordance with this feature, it is possible to reduce a risk of acquiring the rearward movement speed (V) at a time when the pressure during metering of the resin is insufficient.

In the metering step, the rotational speed of the screw (28) may be acquired, and the screw (28) may be moved rearward to the predetermined metering position while the screw (28) is forwardly rotated at the predetermined metering rotational speed, and in the speed determination step, the suck back speed may be determined on the basis of the plurality of rearward movement speeds acquired within a range from a point in time when the rotational speed of the screw (28), in the metering step, has become greater than or equal to the predetermined metering rotational speed and until a point in time when the screw (28) reaches the predetermined metering position. In accordance with this feature, it is possible to reduce a risk of acquiring the rearward movement speed (V) at a time when the rotational speed of the screw (28) at the time of metering of the resin is insufficient.

In the metering step, the screw (28) may be controlled in a manner so that the rearward movement speed reaches a predetermined metering rearward movement speed, and in the speed determination step, the suck back speed may be determined on the basis of the plurality of rearward movement speeds acquired within a range from a point in time when the rearward movement speed of the screw (28), in the metering step, has become greater than or equal to the predetermined metering rearward movement speed and until a point in time when the screw reaches the predetermined metering position. In accordance with this feature, it is possible to reduce a risk of acquiring the rearward movement speed (V) at a time when the rearward movement speed (V) at the time of metering of the resin is insufficient.

In the speed determination step, the suck back speed may be determined based on one of a minimum value, a maximum value, an average value, a median value, and a mode value of the plurality of rearward movement speeds acquired in the metering step. In accordance with this feature, for example, even if one from among the plurality of acquired rearward movement speeds (V) is an abnormal value, determination of the suck back speed (Vsb) on the basis of such an abnormal rearward movement speed (V) can be avoided.

In the speed determination step, after having calculated one of the minimum value, the maximum value, the average value, the median value, and the mode value, the suck back speed which is smaller than the calculated value may be determined by applying a predetermined compensation amount or a predetermined compensation factor to the calculated value. In accordance with this feature, for example, even if one from among the plurality of acquired rearward movement speeds (V) is an abnormal value, determination of the suck back speed (Vsb) on the basis of such an abnormal rearward movement speed (V) can be more reliably avoided.

What is claimed is:

1. A control device for an injection molding machine including a cylinder into which a resin is supplied, and a screw configured to move forward and rearward and rotate inside the cylinder, the control device comprising:
   a metering control unit configured to perform metering of the resin inside the cylinder by controlling a forward rotation and a rearward movement of the screw until the screw has been moved rearward to a predetermined metering position, based on a predetermined metering condition;
   a rearward movement speed acquisition unit configured to acquire a rearward movement speed of the screw during metering;

a speed determination unit configured to determine a suck back speed in order for a pressure of the resin to be made to reach a target pressure, based on the rearward movement speed of the screw acquired during metering by the rearward movement speed acquisition unit; and a suck back control unit configured to cause the screw to be further moved rearward based on the suck back speed, after the screw has reached the predetermined metering position.

2. The control device for the injection molding machine according to claim 1, wherein:

the rearward movement speed acquisition unit acquires rearward movement speeds at a plurality of points in time during metering; and the speed determination unit determines the suck back speed based on a plurality of the rearward movement speeds acquired by the rearward movement speed acquisition unit.

3. The control device for the injection molding machine according to claim 2, further comprising:

a pressure acquisition unit configured to acquire the pressure of the resin during metering;

wherein the metering control unit causes the screw to be moved rearward to the predetermined metering position in a manner so that the pressure of the resin coincides with a predetermined metering pressure; and the speed determination unit determines the suck back speed based on the plurality of rearward movement speeds acquired within a range from a point in time when the pressure of the resin acquired by the pressure acquisition unit has become greater than or equal to the predetermined metering pressure and until a point in time when the screw reaches the predetermined metering position.

4. The control device for the injection molding machine according to claim 2, further comprising:

a rotational speed acquisition unit configured to acquire a rotational speed of the screw;

wherein the metering control unit causes the screw to be moved rearward to the predetermined metering position while the screw is forwardly rotated at a predetermined metering rotational speed; and the speed determination unit determines the suck back speed based on the plurality of rearward movement speeds acquired within a range from a point in time when the rotational speed of the screw acquired by the rotational speed acquisition unit has become greater than or equal to the predetermined metering rotational speed and until a point in time when the screw reaches the predetermined metering position.

5. The control device for the injection molding machine according to claim 2, wherein:

the metering control unit controls the screw in a manner so that the rearward movement speed reaches a predetermined metering rearward movement speed during metering; and the speed determination unit determines the suck back speed based on the plurality of rearward movement speeds acquired within a range from a point in time when the rearward movement speed acquired during metering by the rearward movement speed acquisition unit has become greater than or equal to the predetermined metering rearward movement speed and until a point in time when the screw reaches the predetermined metering position.

6. The control device for the injection molding machine according to claim 2, wherein the speed determination unit determines the suck back speed based on a minimum value, a maximum value, an average value, a median value, or a mode value of the plurality of rearward movement speeds acquired by the rearward movement speed acquisition unit.

7. The control device for the injection molding machine according to claim 6, wherein the speed determination unit obtains one value of the minimum value, the maximum value, the average value, the median value, and the mode value, and applies a predetermined compensation amount or a predetermined compensation factor to the obtained value, thereby determining the suck back speed that is smaller than the obtained value.

8. The control device for the injection molding machine according to claim 1, further comprising a notification unit configured to issue at least one of a notification of the suck back speed determined by the speed determination unit, and a notification that the screw has not been moved rearward based on the suck back speed even though the suck back control unit has caused the screw to be moved rearward.

* * * * *